US012750854B2

(12) United States Patent
Zhang et al.

(10) Patent No.: US 12,750,854 B2
(45) Date of Patent: Sep. 29, 2026

(54) METHOD AND DEVICE USED FOR TIME-BASED RETRANSMISSION IN WIRELESS COMMUNICATION

(71) Applicant: Apogee 5G Global, LLC, Plano, TX (US)

(72) Inventors: Jinfang Zhang, Shanghai (CN); Xiaobo Zhang, Shanghai (CN)

(73) Assignee: Apogee 5G Global, LLC, Plano, TX (US)

(*) Notice: Subject to any disclaimer, the term of this patent is extended or adjusted under 35 U.S.C. 154(b) by 265 days.

(21) Appl. No.: 18/244,306

(22) Filed: Sep. 11, 2023

(65) Prior Publication Data

US 2024/0098750 A1 Mar. 21, 2024

(30) Foreign Application Priority Data

Sep. 19, 2022 (CN) ........................ 202211138661.1

(51) Int. Cl.
*H04W 72/23* (2023.01)
*H04W 72/0446* (2023.01)
*H04W 80/02* (2009.01)

(52) U.S. Cl.
CPC ....... *H04W 72/23* (2023.01); *H04W 72/0446* (2013.01); *H04W 80/02* (2013.01)

(58) Field of Classification Search
CPC . H04W 72/23; H04W 72/0446; H04W 80/02; H04W 72/1263; H04W 76/36; H04L 1/189; H04L 1/0018; H04L 5/0053
See application file for complete search history.

(56) References Cited

U.S. PATENT DOCUMENTS 12,506,562 B2 12/2025 Zhang
2009/0034455 A1* 2/2009 Lee ...................... H04W 72/21 370/329
2018/0054755 A1* 2/2018 Lee ...................... H04W 72/21
(Continued)

FOREIGN PATENT DOCUMENTS

CN 113965960 A 1/2022

OTHER PUBLICATIONS

Third Generation Partnership Project, "Technical Specification Group Radio Access Network; NR; Multiplexing and channel coding (Release 17)," 3GPP TS 38.212 V17.2.0 (Jun. 2022).
(Continued)

*Primary Examiner* — Dady Chery
(74) *Attorney, Agent, or Firm* — Volpe Koenig

(57) ABSTRACT

The present application provides a method and device for wireless communications. A first node receives a first data unit at a MAC sublayer; receives a first signaling, the first signaling indicates a first time-domain resource, the first time-domain resource is reserved for retransmission of a first MAC PDU, the first MAC PDU comprises the first data unit; wherein a first time length is a length of a time interval between a reception of the first data unit and the first time-domain resource, whether to transmit first control information depends on a size relation between the first time length and a first time threshold; the first control information is used to indicate dropping retransmission of the first MAC PDU. The present application can effectively improve radio efficiency, reduce transmission delay, and reduce power consumption of the UE.

17 Claims, 4 Drawing Sheets

(56) References Cited

U.S. PATENT DOCUMENTS

| | | | | |
|---|---|---|---|---|
| 2021/0167928 | A1* | 6/2021 | Xiao | H04L 1/1896 |
| 2021/0168814 | A1* | 6/2021 | Chen | H04W 4/46 |
| 2021/0194639 | A1 | 6/2021 | Yu et al. | |
| 2022/0264619 | A1* | 8/2022 | Hong | H04L 5/0048 |
| 2022/0272679 | A1 | 8/2022 | Wang et al. | |
| 2022/0330210 | A1* | 10/2022 | Zhang | H04W 72/02 |

OTHER PUBLICATIONS

Third Generation Partnership Project, "Technical Specification Group Radio Access Network; NR; Physical layer procedures for data (Release 17)," 3GPP TS 38.214 V17.2.0 (Jun. 2022).

Third Generation Partnership Project, "Technical Specification Group Radio Access Network; NR; Medium Access Control (MAC) protocol specification (Release 17)," 3GPP TS 38.321 V17.1.0 (Jun. 2022).

Interdigital Inc., "Logical Channel Selection Restrictions in LCP," 3GPP TSG-RAN WG2 NR AH#2, R2-170668, 1 Qingdao, P.R. China (Jun. 27-29, 2017).

* cited by examiner

METHOD AND DEVICE USED FOR TIME-BASED RETRANSMISSION IN WIRELESS COMMUNICATION

CROSS REFERENCE TO RELATED APPLICATIONS

This application claims the priority benefit of Chinese Patent Application No. 202211138661.1, filed on Sep. 19, 2022, the full disclosure of which is incorporated herein by reference.

BACKGROUND

Technical Field

The present application relates to methods and devices in wireless communication systems, and in particular to a method and device that support delay-sensitive services in wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct a study of New Radio (NR), or what is called fifth Generation (5G). The work Item (WI) of NR was approved at 3GPP RAN #75 plenary session to standardize NR. In response to the rapidly developed eXtended Reality (XR) and Cloud Gaming (CG) usage scenarios and services, 3GPP RAN1 launched a Study Item (SI) of Study on XR Evaluations for NR in version 17. The study identified XR and CG as important usage scenarios and services for version 18 and subsequent versions. XR and CG refer to various types of augmented, virtual, and mixed environment by performing human-machine communications with the help of handheld and wearable end User Equipment (UE). Many XR and CG use cases have service characteristics of quasi-periodic and high data rate, and have stricter packet delay budgets (PDBs), which pose a series of challenges to NR.

RELATED ART

Inventors have found through researches that in RAN transmission, each Quality of Service (QoS) flow is characterized by a QoS configuration profile, which comprises a maximum transmission delay of a packet, that is, a maximum delay of a data packet from being received to being transmitted. Within the maximum delay, the packet is valid; while after exceeding the maximum delay, the packet becomes useless at higher layer. For delay-sensitive services, if time-domain resources of an uplink grant are later than an effective time of the packet and if the delay-sensitive services are continued to be transmitted through radio network, it's not only a waste of radio resources but also an increase of the UE power consumption.

In response to the above issues, the present application discloses a solution. For services with strict delay requirements, when transmission resources cannot meet delay requirements, it indicates to the network that transmission resources can be released for other data transmissions, thus effectively improving the system capacity and reducing the UE power consumption. And the embodiments in the present application and the characteristics in the embodiments can be arbitrarily combined if there is no conflict. Further, although the present application was originally intended for Uu air interfaces, it can also be applied to PC5 air interfaces. Further, although the present application is originally targeted at scenarios of terminal and base station, it is also applicable to scenarios of relay and base station, where similar technical effects can be achieved. Additionally, the adoption of a unified solution for various scenarios, including but not limited to V2X scenarios and communication scenarios between terminals and base stations, contributes to the reduction of hardware complexity and costs. Particularly, for interpretations of the terminology, nouns, functions and variants (if not specified) in the present application, refer to definitions given in TS36 series, TS38 series and TS37 series of 3GPP specifications.

The present application provides a method in a first node for wireless communications, comprising:

- receiving a first data unit at a MAC sublayer; receiving a first signaling, the first signaling indicating a first time-domain resource, the first time-domain resource being reserved for retransmission of a first MAC PDU, the first MAC PDU comprising the first data unit;
- herein, a first time length is a length of a time interval between a reception of the first data unit and the first time-domain resource, whether to transmit first control information depends on a size relation between the first time length and a first time threshold; the first control information is used to indicate dropping retransmission of the first MAC PDU; the first time threshold is used to indicate a longest time interval between the first data unit being received and the first data unit being transmitted.

In one embodiment, the present application is applicable to delay-sensitive services.

In one embodiment, the present application is applicable to XR services.

In one embodiment, the present application is applicable to the transmitting side.

In one embodiment, a problem to be solved in the present application comprises: determining how to handle retransmissions based on the residing time at the protocol layer.

In one embodiment, the above method can effectively improve the efficiency of the air interface, thus reducing the transmission delay and reducing the UE power consumption.

According to one aspect of the present application, comprising:

- the first control information being uplink control information.

In one embodiment, the unified design adopted by the above method helps to simplify the protocol complexity.

According to one aspect of the present application, comprising:

- when the first time length is greater than the first time threshold, transmitting the first control information.

In one embodiment, the above method can effectively indicate the network by transmitting the first control information, thus achieving beneficial effects of improving the utilization rate of radio resources.

According to one aspect of the present application, comprising:

- transmitting a second MAC PDU on the first time-domain resource, the second MAC PDU not comprising the first data unit;

herein, the first control information indicates a new transmission, and a transmission of the first control information occupies the first time-domain resource.

In one embodiment, the above method can effectively utilize radio resources by transmitting a second MAC PDU on time-domain resources reserved for a retransmission of a first Medium Access Control (MAC) Protocol Data Unit (PDU).

In one embodiment, the above method reduces the transmission delay of a second data unit by transmitting a second MAC PDU on time-domain resources reserved for retransmission of a first MAC PDU.

In one embodiment, the above method reduces the UE transmission power consumption by transmitting a second MAC PDU on time-domain resources reserved for retransmission of a first MAC PDU.

In one embodiment, the above method avoids erroneous decoding by indicating a new transmission.

According to one aspect of the present application, comprising:

the first MAC PDU and the second MAC PDU respectively comprising a second data unit.

In one embodiment, the above method can avoid packet loss by transmitting a second data unit in a first MAC PDU.

According to one aspect of the present application, comprising:

transmitting a first indication from a physical layer of the first node to a MAC sublayer of the first node, the first indication indicating the first time-domain resource;

herein, the first indication is used to determine the first time length.

In one embodiment, the above method obtains a first time length through information exchange between the physical layer and MAC sublayer.

In one embodiment, the above method improves the system performance through inter-layer interaction.

According to one aspect of the present application, comprising:

receiving a second signaling, the second signaling indicating a second time threshold;

herein, the second time threshold indicates a longest residing time of a first PDCP SDU at a PDCP sublayer, and the first PDCP SDU is used to generate the first data unit; the second time threshold and a protocol processing time are used to determine the first time threshold.

The present application provides a method in a second node for wireless communications, comprising:

transmitting a first signaling, the first signaling indicating a first time-domain resource, the first time-domain resource being reserved for retransmission of a first MAC PDU, the first MAC PDU comprising the first data unit;

herein, a first data unit is received at a MAC sublayer by a receiver of the first signaling; a first time length is a length of a time interval between a reception of the first data unit and the first time-domain resource, whether to receive the first control information depends on a size relation between the first time length and the first time threshold; the first control information is used to indicate dropping retransmission of the first MAC PDU; the first time threshold is used to indicate a longest time interval between the first data unit being received and the first data unit being transmitted.

According to one aspect of the present application, comprising:

the first control information being uplink control information.

According to one aspect of the present application, comprising:

when the first time length is greater than the first time threshold, receiving the first control information.

According to one aspect of the present application, comprising:

receiving a second MAC PDU on the first time-domain resource, the second MAC PDU not comprising the first data unit;

herein, the first control information indicates a new transmission, and a transmission of the first control information occupies the first time-domain resource.

According to one aspect of the present application, comprising:

the first MAC PDU and the second MAC PDU respectively comprising a second data unit.

According to one aspect of the present application, comprising:

a first indication being transmitted from a physical layer of a receiver of the first signaling to a MAC sublayer of the receiver of the first signaling, and the first indication indicating the first time-domain resource;

herein, the first indication is used to determine the first time length.

According to one aspect of the present application, comprising:

transmitting a second signaling, the second signaling indicating a second time threshold;

herein, the second time threshold indicates a longest residing time of a first PDCP SDU at a PDCP sublayer, and the first PDCP SDU is used to generate the first data unit; the second time threshold and a protocol processing time are used to determine the first time threshold.

The present application provides a first node for wireless communications, comprising:

a first receiver, receiving a first data unit at a MAC sublayer; receiving a first signaling, the first signaling indicating a first time-domain resource, the first time-domain resource being reserved for retransmission of a first MAC PDU, the first MAC PDU comprising the first data unit;

herein, a first time length is a length of a time interval between a reception of the first data unit and the first time-domain resource, whether to transmit first control information depends on a size relation between the first time length and a first time threshold; the first control information is used to indicate dropping retransmission of the first MAC PDU; the first time threshold is used to indicate a longest time interval between the first data unit being received and the first data unit being transmitted.

The present application provides a second node for wireless communications, comprising:

a second transmitter, transmitting a first signaling, the first signaling indicating a first time-domain resource, the first time-domain resource being reserved for retransmission of a first MAC PDU, the first MAC PDU comprising the first data unit;

herein, a first data unit is received at a MAC sublayer by a receiver of the first signaling; a first time length is a length of a time interval between a reception of the first data unit and the first time-domain resource, whether to receive the first control information depends on a size relation between the first time length and the first time threshold; the first control information is used to indicate dropping retransmission of the first MAC PDU; the first time threshold is used to indicate a longest time interval between the first data unit being received and the first data unit being transmitted.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
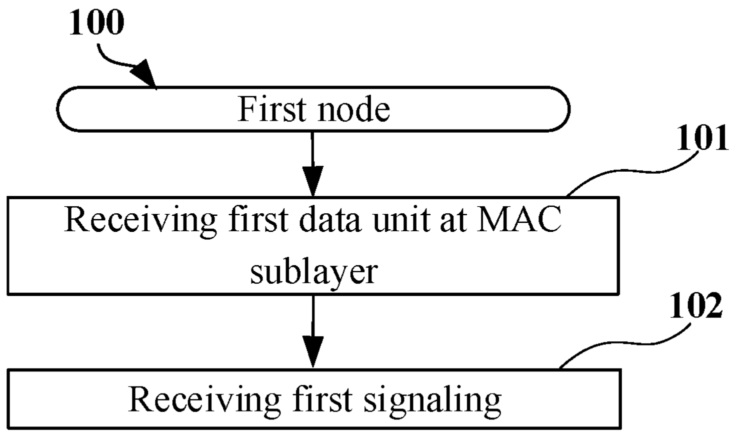
FIG. 1 illustrates a flowchart of transmission of a first node according to one embodiment of the present application.

Embodiment 1 illustrates a flowchart of transmission of a first node according to one embodiment of the present application, as shown in FIG. 1.

In Embodiment 1, a first node 100 receives a first data unit set at a MAC sublayer in step 101; receives a first signaling in step 102; herein, the first signaling indicates a first time-domain resource, the first time-domain resource is reserved for retransmission of a first MAC PDU, the first MAC PDU comprises the first data unit; a first time length is a length of a time interval between a reception of the first data unit and the first time-domain resource, whether to transmit first control information depends on a size relation between the first time length and a first time threshold; the first control information is used to indicate dropping retransmission of the first MAC PDU; the first time threshold is used to indicate a longest time interval between the first data unit being received and the first data unit being transmitted.

In one embodiment, a first data unit is received at a MAC sublayer.

In one embodiment, the first data unit is submitted from an upper layer of the first node to a MAC sublayer of the first node.

In one embodiment, the upper layer is a Radio Link Control (RLC) sublayer.

In one embodiment, the first data unit belongs to a non-signaling radio bearer.

In one embodiment, the non-signaling radio bearer is a radio bearer other than a Signaling Radio Bearer (SRB).

In one embodiment, the non-signaling radio bearer is a Data Radio Bearer (DRB).

In one embodiment, the non-signaling radio bearer is an MBS radio bearer (MRB).

In one embodiment, the first data unit comprises user data.

In one embodiment, the first data unit is a MAC Service Data Unit (SDU).

In one embodiment, the first data unit is an RLC SDU.

In one embodiment, the first data unit is an RLC SDU segment.

In one embodiment, the first data unit comprises at least one bit.

In one embodiment, the first data unit comprises at least one byte.

In one embodiment, a first signaling is received at a physical layer.

In one embodiment, the first signaling is a physical-layer signaling.

In one embodiment, a first signaling is received via an air interface.

In one embodiment, the air interface is a Uu interface.

In one embodiment, the air interface is a PC5 interface.

In one embodiment, the first signaling is transmitted internally within the first node.

In one embodiment, the first signaling is transferred from a higher layer of the first node to a physical layer of the first node.

In one embodiment, the first signaling is pre-configured.

In one embodiment, the first signaling is configured.

In one embodiment, the first signaling is configured and activated.

In one embodiment, the first signaling is a scheduling signaling.

In one embodiment, the first signaling is a dynamical scheduling signaling.

In one embodiment, the first signaling is a Physical Downlink Control Channel (PDCCH).

In one embodiment, the first signaling is Downlink Control Information (DCI).

In one embodiment, the first signaling indicates a UL grant.

In one embodiment, the first signaling indicates a UL grant of configured UL grant type 1.

In one embodiment, the first signaling indicates a UL grant of configured UL grant type 2.

In one embodiment, the first signaling indicates an SL grant.

In one embodiment, the first signaling indicates an SL grant of SL configured grant type 1.

In one embodiment, the first signaling indicates an SL grant of SL configured grant type 2.

In one embodiment, the first signaling is for a serving cell of the first node and is addressed to a Cell-Radio Network Temporary Identifier (C-RNTI), or a temporary C-RNTI of a MAC entity to which the serving cell belongs.

In one embodiment, the first signaling is for a serving cell of the first node and is addressed to a Configured Scheduling (CS)-RNTI of a MAC entity to which the serving cell belongs.

In one embodiment, the first signaling is for a serving cell of the first node and is addressed to an SL-RNTI, or an SL-CS-RNTI of a MAC entity to which the serving cell belongs.

In one embodiment, the first signaling comprises scheduling information.

In one embodiment, the first signaling indicates a first time-domain resource.

In one embodiment, the first signaling indicates at least one of frequency-domain resources, Hybrid Automatic Repeat Request (HARQ) information, or Modulation and Coding Scheme (MCS) information.

In one embodiment, the first time-domain resource comprises at least one slot.

In one embodiment, the first time-domain resource comprises at least one subframe.

In one embodiment, the first time-domain resource comprises at least one symbol.

In one embodiment, the symbol is an Orthogonal Frequency Division Multiplexing (OFDM) symbol.

In one embodiment, the symbol is a multi-carrier symbol.

In one embodiment, the symbol is a single-carrier symbol.

In one embodiment, the first time-domain resource is reserved for retransmission of a first MAC PDU.

In one embodiment, the first time-domain resource being reserved for retransmission of a first MAC PDU comprises: the first signaling is used to schedule a retransmission of the first MAC PDU.

In one embodiment, the first time-domain resource being reserved for retransmission of a first MAC PDU comprises: the first signaling indicates a retransmission, and a most recent signaling before the first signaling indicating a same HARQ process is used to schedule a new transmission or retransmission of the first MAC PDU.

In one embodiment, the first signaling indicating a retransmission comprises: a value of a New Data Indication (NDI) field comprised in the first signaling is not toggled; herein, a Cyclic Redundancy Check (CRC) of the first signaling is scrambled by a C-RNTI, or a CRC of the first signaling is scrambled by an SL-RNTI.

In one embodiment, the first signaling indicating a retransmission comprises: a value of an NDI field comprised in the first signaling is 1; herein, a CRC of the first signaling is scrambled by a CS-RNTI.

In one subembodiment of the above two embodiments, the first signaling is a dynamical scheduling signaling.

In one embodiment, a value of an NDI field comprised in the first signaling not being toggled comprises: a value of an NDI field comprised in the first signaling is the same as a value of an NDI field comprised in a most recent signaling before the first signaling indicating a same HARQ process.

In one subembodiment of the above embodiment, a value of an NDI field comprised in the first signaling is 0, and a value of an NDI field comprised in a most recent signaling before the first signaling indicating a same HARQ process is 1; or, a value of an NDI field comprised in the first signaling is 1, and a value of an NDI field comprised in a most recent signaling before the first signaling indicating a same HARQ process is 0.

In one embodiment, the first MAC PDU comprises the first data unit.

In one embodiment, the first data unit is multiplexed into the first MAC PDU.

In one embodiment, the first MAC PDU comprises at least one MAC subPDU, and the at least one MAC subPDU comprises the first data unit.

In one embodiment, the first MAC PDU is transmitted through UL.

In one embodiment, the first MAC PDU is transmitted through SL.

In one embodiment, a first time length is a length of a time interval between a reception of the first data unit and the first time-domain resource.

In one embodiment, a first time length being a length of a time interval between a reception of the first data unit and the first time-domain resource comprises: a first time length is a length of a time interval between a reception time of the first data unit and a start time of the first time-domain resource.

In one embodiment, a start time of the first time-domain resource comprises: a start time of the first one of slots comprised in the first time-domain resource; herein, the first time-domain resource comprises at least one slot.

In one embodiment, a start time of the first time-domain resource comprises: a start time of the first one of subframes comprised in the first time-domain resource; herein, the first time-domain resource comprises at least one subframe.

In one embodiment, a start time of the first time-domain resource comprises: a start time of the first one of symbols comprised in the first time-domain resource; herein, the first time-domain resource comprises at least one symbol.

In one embodiment, a first time length being a length of a time interval between a reception of the first data unit and the first time-domain resource comprises: a first time length is a length of a time interval between a reception time of the first data unit and an end time of the first time-domain resource.

In one embodiment, an end time of the first time-domain resource comprises: an end time of a last slot comprised in the first time-domain resource; herein, the first time-domain resource comprises at least one slot.

In one embodiment, an end time of the first time-domain resource comprises: an end time of a last subframe comprised in the first time-domain resource; herein, the first time-domain resource comprises at least one subframe.

In one embodiment, an end time of the first time-domain resource comprises: an end time of a last symbol comprised in the first time-domain resource; herein, the first time-domain resource comprises at least one symbol.

In one embodiment, a reception time of the first data unit is a time when the first data unit is received at the MAC sublayer.

In one embodiment, the first time length comprises Q1 time unit(s); herein, Q1 is a positive number.

In one embodiment, the time unit is slot.

In one embodiment, the time unit is symbol.

In one embodiment, the time unit is ms.

In one embodiment, whether to transmit first control information depends on a size relation between the first time length and a first time threshold.

In one embodiment, the first transmitter determines whether to transmit first control information based on a size relation between the first time length and a first time threshold.

In one embodiment, the first control information is uplink control information.

In one embodiment, the first control information is Uplink Control Information (UCI).

In one embodiment, the first control information comprises at least comprises one bit.

In one embodiment, the first control information comprises one bit.

In one embodiment, a name of the first control information comprises timeout.

In one embodiment, the first control information is used to indicate dropping retransmission of the first MAC PDU.

In one embodiment, the first control information being used to indicate dropping retransmission of the first MAC PDU comprises: the first control information indicates that the first time domain resource is not used for a retransmission of the first MAC PDU.

In one embodiment, the first control information being used to indicate dropping retransmission of the first MAC PDU comprises: the first control information indicates that the first node no longer performs retransmission for the first MAC PDU.

In one embodiment, the first control information being used to indicate dropping retransmission of the first MAC PDU comprises: the first control information indicates that a second node in the present application drops retransmission scheduling for the first MAC PDU.

In one embodiment, the first time threshold is used to indicate a longest time interval between the first data unit being received at the MAC sublayer and the first data unit being transmitted.

In one embodiment, the first time threshold being used to indicate a longest time interval between the first data unit being received at the MAC sublayer and the first data unit being transmitted comprises: the first time threshold is used to indicate a longest time interval length between the first data unit being received at the MAC sublayer and a radio signal carrying the first data unit being transmitted.

In one embodiment, the first time threshold is used to indicate a data packet delay budget of the first data unit.

In one embodiment, the first time threshold is used to indicate a remaining packet delay budget (PDB) of the first data unit.

In one embodiment, the first time threshold comprises Q2 time unit(s); herein, Q2 is a positive number.

Embodiment 2

Figure 2:
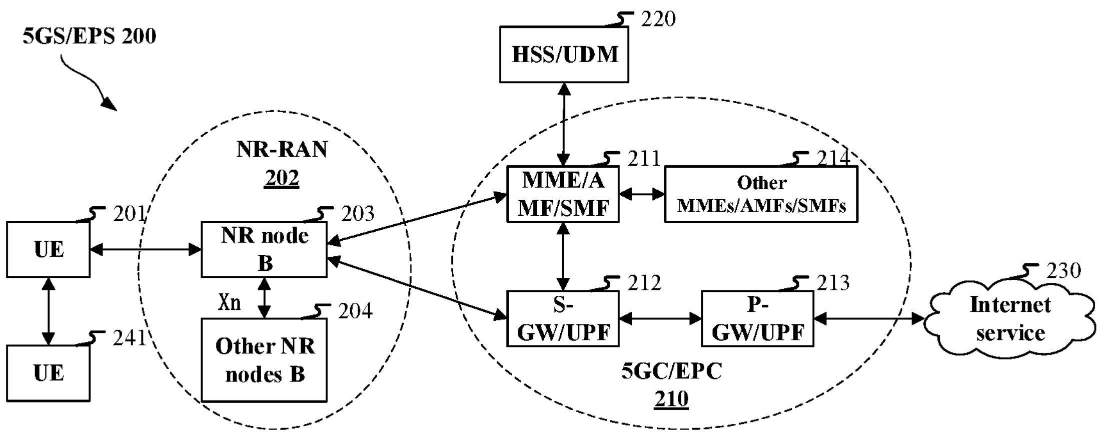
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a network architecture 200 of 5G NR, Long-Term Evolution (LTE), and Long-Term Evolution Advanced (LTE-A) systems. The NR 5G, LTE or LTE-A network architecture 200 may be called a 5G System (5GS)/Evolved Packet System (EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). XnAP protocol of Xn interface is used to transmit control plane messages of wireless networks, and user plane protocol of Xn interface is used to transmit user plane data. The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms, and in Non Terrestrial Networks (NTNs), the gNB 203 can be a satellite, an aircraft or a terrestrial base station relayed through a satellite. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, vehicle equipment, On-board communication unit, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the gNB 203 corresponds to the second node in the present application.

In one embodiment, the UE 201 is a UE.

In one embodiment, the UE 201 is a relay device.

In one embodiment, the UE 201 is a RoadSide Unit (RSU).

In one embodiment, the gNB 203 is a Marco Cell base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay differences.

In one embodiment, the gNB 203 is a flight platform.

In one embodiment, the gNB 203 is satellite equipment.

In one embodiment, the gNB 203 is a base station that supports large delay differences.

In one embodiment, the gNB 203 is a test device (e.g., a transceiver device simulating partial functions of a base station, a signaling tester).

In one embodiment, a radio link from the UE 201 to the gNB 203 is an uplink, and the uplink is used for executing an uplink transmission.

In one embodiment, a radio link from the gNB 203 to the UE 201 is a downlink, and the downlink is used for executing a downlink transmission.

In one embodiment, a radio link between the UE 201 and the UE 241 is a sidelink, and the sidelink is used for executing a sidelink transmission.

In one embodiment, the UE 201 and the gNB 203 are connected via a Uu air interface.

In one embodiment, the UE 201 and the UE 241 are connected via a PC5 air interface.

Embodiment 3

Figure 3:
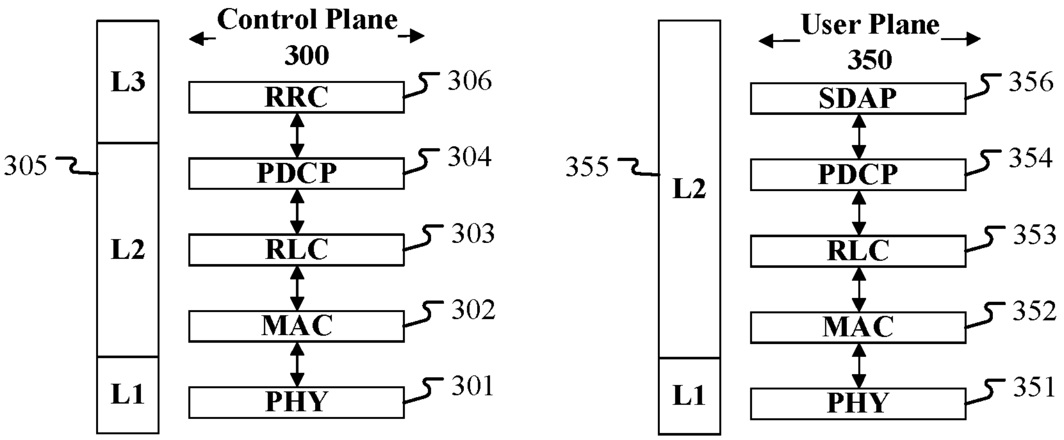
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for the control plane 300 of a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the UE and the gNB via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. The PDCP sublayer 304 provides data encryption and integrity protection and also provides support for a UE handover between gNBs. The RLC sublayer 303 provides packet segmentation and reassembly, and retransmission of lost packets is achieved through Automatic Repeat Request (ARQ). The RLC sublayer 303 also provides duplicate packet detection and protocol error detection. The MAC sublayer 302 provides mapping between a logic channel and a transport channel and multiplexing of the logical channel. The MAC sublayer 302 is also responsible for allocating between UEs various radio resources (i.e., resources block) in a cell. The MAC sublayer 302 is also responsible for Hybrid Automatic Repeat Request (HARQ) operation. The Radio Resource Control (RRC) sublayer 306 in layer 3 (L3) of the control plane 300 is responsible for acquiring radio resources (i.e., radio bearer) and configuring the lower layer with an RRC signaling between the gNB and the UE. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. The radio protocol architecture of the UE in the user plane 350 may comprises part or all of protocol sublayers of the SDAP sublayer 356, the PDCP sublayer 354, the RLC sublayer 353 and the MAC sublayer 352 at L2 layer. Although not described in FIG. 3, the UE may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, entities of multiple sublayers of the control plane in FIG. 3 form an SRB in the vertical direction.

In one embodiment, entities of multiple sublayers of the user plane in FIG. 3 form a DRB in the vertical direction.

In one embodiment, entities of multiple sublayers of the user plane in FIG. 3 form an MRB in the vertical direction.

In one embodiment, the first data unit in the present application is generated by the RLC 353.

In one embodiment, the first signaling in the present application is generated by the PHY 301.

In one embodiment, the first signaling in the present application is generated by the PHY 351.

In one embodiment, the first control information in the present application is generated by the MAC 302.

In one embodiment, the first control information in the present application is generated by the MAC 352.

In one embodiment, the first MAC PDU in the present application is generated by the MAC 352.

In one embodiment, the second MAC PDU in the present application is generated by the MAC 352.

In one embodiment, the first indication in the present application is generated by the PHY 301.

In one embodiment, the first indication in the present application is generated by the PHY 351.

In one embodiment, the second signaling in the present application is generated by the RRC 306.

In one embodiment, at a protocol layer, a data unit received from the upper layer is an SDU, and a data unit processed by the protocol layer is a PDU, which is submitted to the lower layer.

In one embodiment, at a protocol layer, a data unit received from the lower layer is a PDU, and a data unit processed by the protocol layer is an SDU, which is submitted to the upper layer.

In one embodiment, taking the PDCP sublayer as an example, at the transmitting side, the PDCP sublayer receives a PDCP SDU from the SDAP sublayer, and after being processed by the PDCP sublayer, a PDCP PDU is generated to be submitted to the RLC sublayer.

In one embodiment, taking data transferred on an interface between the PDCP sublayer and the RLC sublayer as an example, a PDU generated by a PDCP is called a PDCP PDU at the PDCP sublayer and is called an RLC SDU at the RLC sublayer, that is, the PDCP sublayer transmits a PDCP PDU to the RLC sublayer, and the RLC sublayer receives an RLC SDU from the PDCP sublayer.

In one embodiment, an SDAP PDU and a PDCP SDU can be interchanged, a PDCP PDU and an RLC SDU can be interchanged, and an RLC PDU and a MAC SDU can be interchanged.

In one embodiment, the L2 layer 305 or 355 belongs to a higher layer.

In one embodiment, the RRC sublayer 306 at the L3 layer belongs to a higher layer.

Embodiment 4

Figure 4:
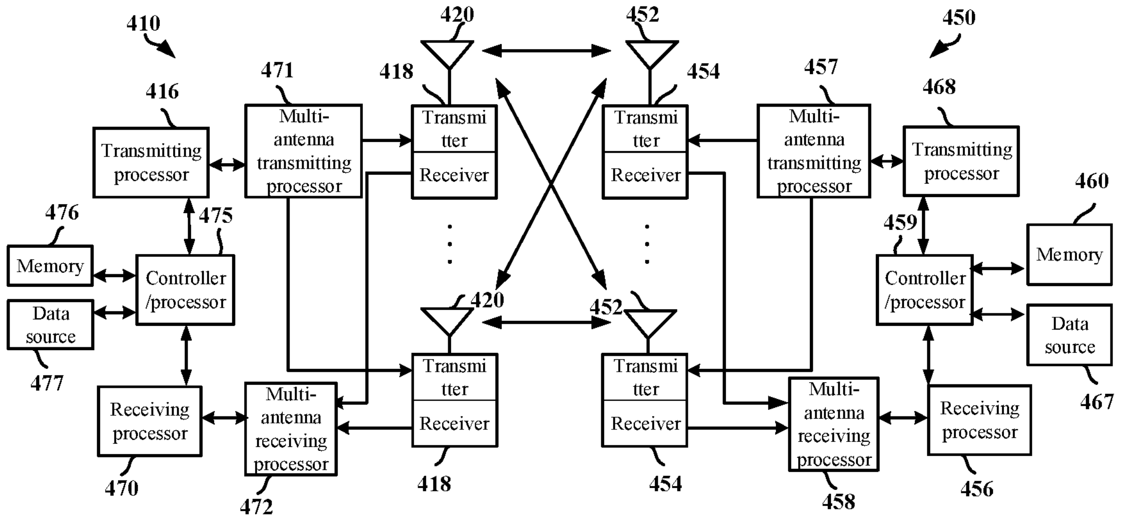
FIG. 4 illustrates a schematic diagram of hardware modules of a communication device according to one embodiment of the present application.

Embodiment 4 illustrates a schematic diagram of hardware modules of a communication device according to one embodiment of the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a data source 477, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from the core network or a higher layer packet from the data source 477 is provided to the controller/processor 475. The core network and the data source 477 represents all protocol layers above the L2 layer. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In a transmission from the second communication device 410 to the first communication device 450, the controller/processor 459 provides multiplexing between a transport channel and a logical channel, packet reassembling, decryption, header decompression, control signal processing so as to recover a higher-layer packet from the second communication device 410. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the first communication device 450. The higher layer packet from the controller/processor 475 can be provided to all protocol layers above the core network or the L2 layer, and various control signals can also be provided to the core network or L3 layer for L3 layer processing.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first data unit at a MAC sublayer; receives a first signaling, the first signaling indicates a first time-domain resource, the first time-domain resource is reserved for retransmission of a first MAC PDU, the first MAC PDU comprises the first data unit; herein, a first time length is a length of a time interval between a reception of the first data unit and the first time-domain resource, whether to transmit first control information depends on a size relation between the first time length and a first time threshold; the first control information is used to indicate dropping retransmission of the first MAC PDU; the first time threshold is used to indicate a longest time interval between the first data unit being received and the first data unit being transmitted.

In one embodiment, the first communication device 450 comprises: a memory that stores a computer readable instruction program. The computer readable instruction program generates an action when executed by at least one processor. The action includes: receiving a first data unit at a MAC sublayer; receiving a first signaling, the first signaling indicating a first time-domain resource, the first time-domain resource being reserved for retransmission of a first MAC PDU, the first MAC PDU comprising the first data unit; herein, a first time length is a length of a time interval between a reception of the first data unit and the first time-domain resource, whether to transmit first control information depends on a size relation between the first time length and a first time threshold; the first control information is used to indicate dropping retransmission of the first MAC PDU; the first time threshold is used to indicate a longest time interval between the first data unit being received and the first data unit being transmitted.

In one embodiment, the second node 400 comprises at least one processor and at least one memory. The at least one memory comprises computer program codes; the at least one memory and the computer program codes are configured to be used in collaboration with the at least one processor. The second node 410 at least transmits a first signaling, the first signaling indicates a first time-domain resource, the first time-domain resource is reserved for retransmission of a first MAC PDU, the first MAC PDU comprises the first data unit; herein, a first data unit is received at a MAC sublayer by a receiver of the first signaling; a first time length is a length of a time interval between a reception of the first data unit and the first time-domain resource, whether to receive the first control information depends on a size relation between the first time length and the first time threshold; the first control information is used to indicate dropping retransmission of the first MAC PDU; the first time threshold is used to indicate a longest time interval between the first data unit being received and the first data unit being transmitted.

In one embodiment, the second node 410 comprises a memory that stores a computer readable instruction program. The computer readable instruction program generates an action when executed by at least one processor. The action includes: transmitting a first signaling, the first signaling indicating a first time-domain resource, the first time-domain resource being reserved for retransmission of a first MAC PDU, the first MAC PDU comprising the first data unit; herein, a first data unit is received at a MAC sublayer by a receiver of the first signaling; a first time length is a length of a time interval between a reception of the first data unit and the first time-domain resource, whether to receive the first control information depends on a size relation between the first time length and the first time threshold; the first control information is used to indicate dropping retransmission of the first MAC PDU; the first time threshold is used to indicate a longest time interval between the first data unit being received and the first data unit being transmitted.

In one embodiment, the first communication device 450 corresponds to a first node in the present application.

In one embodiment, the second communication device 410 corresponds to a second node in the present application.

In one embodiment, the first communication device 450 is a UE.

In one embodiment, the first communication device 450 is a relay node.

In one embodiment, the first communication device 450 is a UE that supports V2X.

In one embodiment, the first communication device 450 is vehicle equipment.

In one embodiment, the first communication device 450 is an RSU.

In one embodiment, the second communication device 410 is a base station (gNB/eNB).

In one embodiment, the second communication device 410 is a base station that supports V2X.

In one embodiment, the second communication device 410 is a vehicle-mounted device.

In one embodiment, the second communication device 410 is an RSU device.

In one embodiment, at least one of the antenna 452, the receiver 454, the multi-antenna receiving processor 458, the receiving processor 456 or the controller/processor 459 is used to receive a first data unit in the present application.

In one embodiment, at least one of the antenna 420, the transmitter 418, the multi-antenna transmitting processor 471, the transmitting processor 416 or the controller/processor 475 is used to transmit a first signaling in the present application.

In one embodiment, at least one of the antenna 452, the receiver 454, the multi-antenna receiving processor 458, the receiving processor 456 or the controller/processor 459 is used to receive a first signaling in the present application.

In one embodiment, at least one of the antenna 452, the transmitter 454, the multi-antenna transmitting processor 457, the transmitting processor 468 or the controller/processor 459 is used to transmit first control information in the present application.

In one embodiment, at least one of the antenna 420, the receiver 418, the multi-antenna receiving processor 472, the receiving processor 470 or the controller/processor 475 is used to receive first control information in the present application.

In one embodiment, at least one of the antenna 452, the transmitter 454, the multi-antenna transmitting processor 457, the transmitting processor 468 or the controller/processor 459 is used to transmit a second MAC PDU in the present application.

In one embodiment, at least one of the antenna 420, the receiver 418, the multi-antenna receiving processor 472, the receiving processor 470 or the controller/processor 475 is used to receive a second MAC PDU in the present application.

In one embodiment, at least one of the antenna 452, the transmitter 454, the multi-antenna transmitting processor 457, the transmitting processor 468 or the controller/processor 459 is used to transmit a first indication in the present application.

In one embodiment, at least one of the antenna 420, the transmitter 418, the multi-antenna transmitting processor 471, the transmitting processor 416 or the controller/processor 475 is used to transmit a second signaling in the present application.

In one embodiment, at least one of the antenna 452, the receiver 454, the multi-antenna receiving processor 458, the receiving processor 456 or the controller/processor 459 is used to receive a second signaling in the present application.

Embodiment 5

Figure 5:
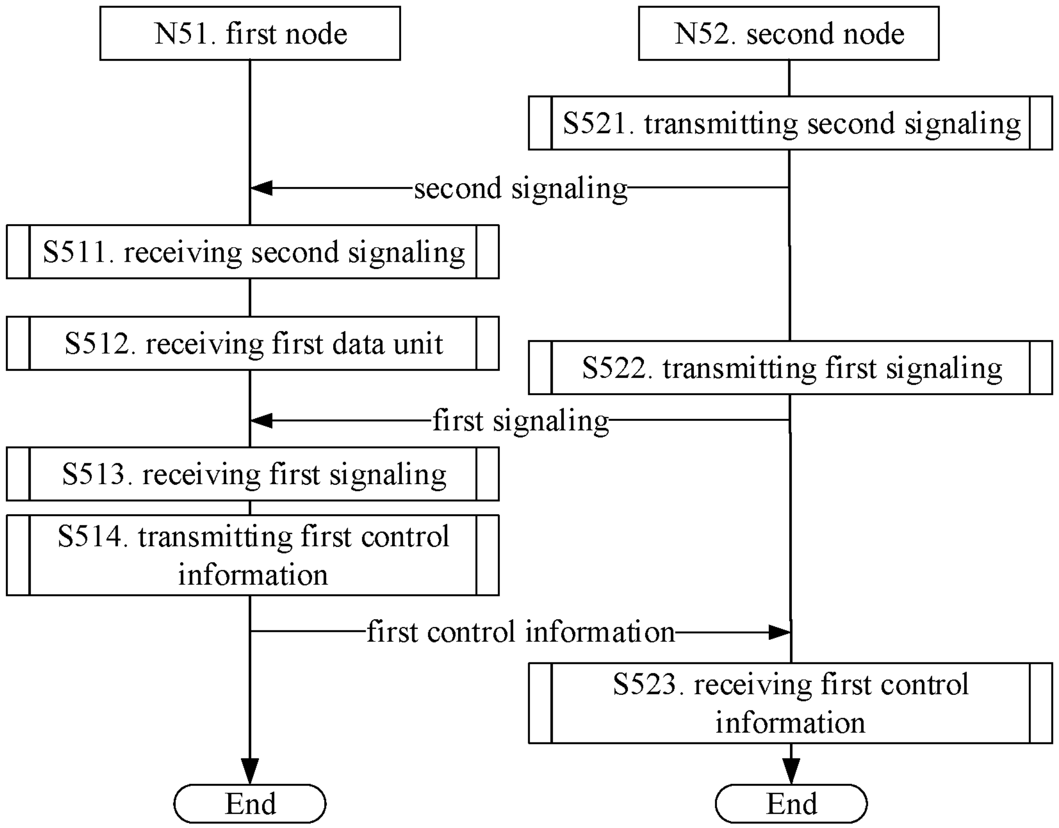
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, a first node N51 and a second node N52 are in communications via a Uu air interface. It is particularly underlined that the order illustrated in the embodiment does not put constraints over sequences of signal transmissions and implementations.

The first node N51 receives a second signaling in step S511; receives a first data unit in step S512; receives a first signaling in step S513; transmits first control information in step S514.

The second node N52 transmits a second signaling in step S521; transmits a first signaling in step S522; receives first control information in step S523.

In embodiment 5, a first data unit is received at a MAC sublayer; a first signaling is received, the first signaling indicates a first time-domain resource, the first time-domain resource is reserved for retransmission of a first MAC PDU, the first MAC PDU comprises the first data unit; herein, a first time length is a length of a time interval between a reception of the first data unit and the first time-domain resource, whether to transmit first control information depends on a size relation between the first time length and a first time threshold; the first control information is used to indicate dropping retransmission of the first MAC PDU; the first time threshold is used to indicate a longest time interval between the first data unit being received and the first data unit being transmitted; a second signaling is received, and the second signaling indicates a second time threshold; herein, the second time threshold indicates a longest residing time of a first PDCP SDU at a PDCP sublayer, and the first PDCP SDU is used to generate the first data unit; the second time threshold and a protocol processing time are used to determine the first time threshold; the first control information is UCI.

Embodiment 5 is applicable to scenarios where the first time length is greater than the first time threshold.

In one embodiment, the second node N52 is a maintenance base station for a serving cell of the first node N51.

In one embodiment, the second node N52 is a Transmit/Receive Point (TRP) of the first node N51.

In one embodiment, the second node N52 is a base station of a primary cell of the first node N51.

In one embodiment, the second node N52 is a base station of a secondary cell of the first node N51.

In one embodiment, a second signaling is received, and the second signaling indicates a second time threshold.

In one embodiment, the second signaling is received at RRC layer.

In one embodiment, the second signaling is transmitted via the air interface.

In one embodiment, the second signaling is configured.

In one embodiment, the second signaling is a higher-layer signaling.

In one embodiment, the second signaling is an RRC signaling.

In one embodiment, the second signaling comprises all or partial Information Elements (IEs) in an RRC signaling.

In one embodiment, the second signaling comprises all or partial fields in an IE in an RRC signaling.

In one embodiment, the second signaling is an RRCReconfiguration message.

In one embodiment, the second time threshold comprises Q3 time unit(s); herein, Q3 is a positive number.

In one embodiment, a value of the Q3 is not less than a value of the Q2.

In one embodiment, the first receiver receives a second signaling, and the second signaling indicates a second time threshold; herein, the second time threshold indicates a longest residing time of a first PDCP SDU at a PDCP sublayer, and the first PDCP SDU is used to generate the first data unit; the second time threshold and a protocol processing time are used to determine the first time threshold.

In one embodiment, the second time threshold indicates a longest residing time of a first PDCP SDU at a PDCP sublayer.

In one embodiment, the second time threshold indicating a longest residing time of a first PDCP SDU at a PDCP sublayer comprises: the second time threshold indicates a PDB of a first PDCP SDU.

In one embodiment, the second time threshold indicating a longest residing time of a first PDCP SDU at a PDCP sublayer comprises: starting a first timer upon receiving the first PDCP SDU, and dropping the first PDCP SDU upon an expiration of the first timer; herein, the second time threshold is an expiration value of the first timer.

In one embodiment, the second time threshold indicating a longest residing time of a first PDCP SDU at the PDCP sublayer comprises: starting a first timer upon receiving the first PDCP SDU, and dropping the first PDCP SDU upon an expiration of the first timer; if a corresponding PDCP data PDU has been submitted to a lower layer, transmitting a dropping indication to the lower layer; herein, the second time threshold is an expiration value of the first timer.

In one subembodiment of the above embodiment, the lower layer is an RLC sublayer.

In one subembodiment of the above embodiment, the lower layer is a MAC sublayer.

In one embodiment, the first timer is maintained at a PDCP sublayer.

In one embodiment, the first timer is a dropTimer, and the second time threshold is configured by the network.

In one embodiment, the first timer is in a running state after being started.

In one embodiment, when the first timer is in a running state, the first timer is updated in a following time interval, and then it is judged whether the first timer is expired.

In one embodiment, the time interval comprises 1 ms.

In one embodiment, the time interval comprises a time length of one slot.

In one embodiment, the time interval comprises a time length of one subframe.

In one embodiment, setup a value of the first timer to 0 when starting the first timer, and the phrase of updating the first timer comprises: increasing a value of the first timer by 1; when a value of the first timer is the second time threshold, it is determined that the first timer is expired.

In one embodiment, setup a value of the first timer to the second time threshold when starting the first timer, and the phrase of updating the first timer comprises: decreasing a value of the first timer by 1; when a value of the first timer is 0, it is determined that the first timer is expired.

In one embodiment, the first PDCP SDU is used to generate the first data unit.

In one embodiment, the first PDCP SDU being used to generate the first data unit comprises: the first PDCP SDU generates the first data unit after respectively being processed by the PDCP protocol and the RLC protocol, and the first data unit is a MAC SDU.

In one embodiment, the PDCP protocol processing comprises Integrity protection and verification.

In one embodiment, the PDCP protocol processing comprises ciphering.

In one embodiment, the PDCP protocol processing comprises RObust Header Compression (ROHC).

In one embodiment, the PDCP protocol processing comprises adding a PDCP protocol header.

In one embodiment, the RLC protocol processing comprises adding an RLC protocol header.

In one embodiment, the RLC protocol processing comprises segmentation.

In one embodiment, the second time threshold and a protocol processing time are used to determine the first time threshold.

In one embodiment, the first receiver determines the first time threshold based on the second time threshold and a protocol processing time.

In one embodiment, the second time threshold and a protocol processing time being used to determine the first time threshold comprises: a difference of the second time threshold minus a protocol processing time at a PDCP sublayer and a protocol processing time at an RLC sublayer is the first time threshold.

In one embodiment, the first time threshold is a remaining packet delay budget (remaining PDB).

In one embodiment, the first signaling indicates a second time-domain resource, the second time-domain resource is used for a transmission other than a retransmission of the first MAC PDU, and the first time-domain resource is not later than the second time-domain resource.

In one embodiment, the phrase that the first signaling indicates a second time-domain resource, the second time-domain resource is used for a transmission other than a retransmission of the first MAC PDU, and the first time-domain resource is not later than the second time-domain resource comprises: the first signaling schedules a transmission of multiple radio signals, where the first time-domain resource is used for a transmission of a first one of the multiple radio signals.

In one embodiment, when the first signaling indicates a second time-domain resource, the second time-domain resource is used for a transmission other than a retransmission of the first MAC PDU, and the first time-domain resource is earlier than the second time-domain resource.

In one embodiment, the phrase that the first time-domain resource is not later than the second time-domain resource comprises: a start time of the first time-domain resource is not later than a start time of the second time-domain resource.

In one embodiment, the phrase that the first time-domain resource is not later than the second time-domain resource comprises: an end time of the first time-domain resource is not later than an end time of the second time-domain resource.

In one embodiment, when the first MAC PDU is transmitted through sidelink, the first time-domain resource is used for a new transmission on sidelink, and the first control information is transmitted through a Physical Uplink Control Channel (PUCCH).

In one subembodiment of the above embodiment, the first control information and a HARQ-ACK (Acknowledgement) feedback for the new transmission are multiplexed onto the PUCCH.

Embodiment 6

Figure 6:
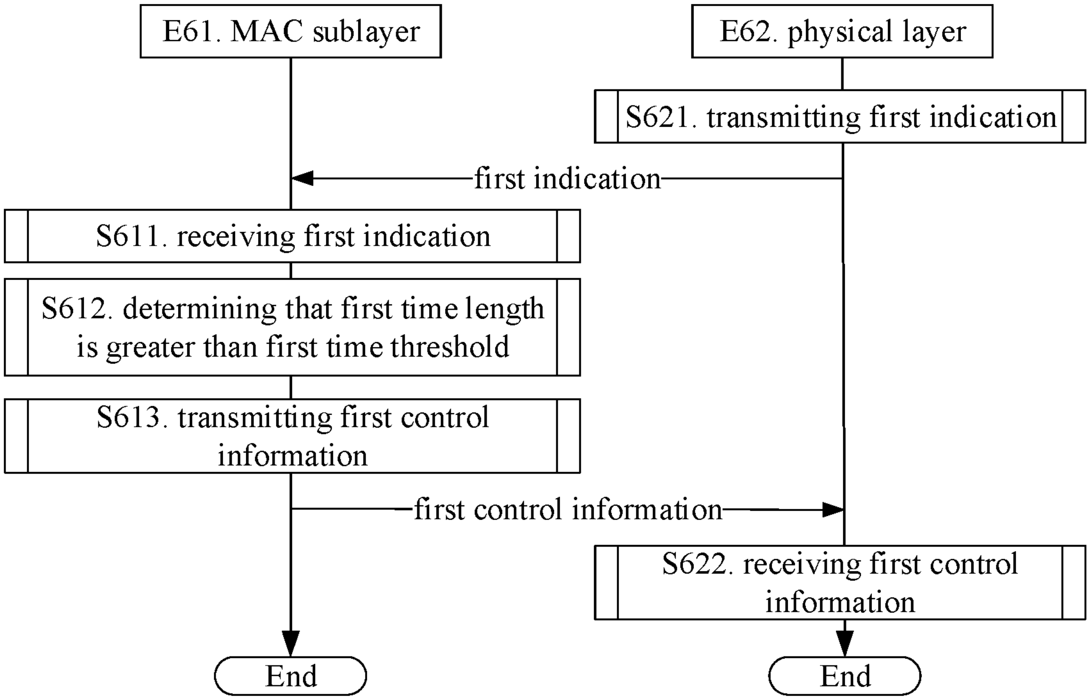
FIG. 6 illustrates a flowchart of signal transmission according to one embodiment of the present application.

Embodiment 6 illustrates a flowchart of signal transmission according to one embodiment of the present application, as shown in FIG. 6. In FIG. 6, both the MAC sublayer E61 and the physical layer E62 are located at a first node, and the MAC sublayer E61 and the physical layer E62 are in communications via an interlayer interface. It is particularly underlined that the order illustrated in the embodiment does not put constraints over sequences of signal transmissions and implementations.

The MAC sublayer E61 receives a first indication in step S611; determines in step S612 that a first time length is greater than a first time threshold; transmits first control information in step S613.

The physical layer E62 transmits a first indication in step S621; receives first control information in step S622.

In one embodiment, a first indication is transmitted from a physical layer of the first node to a MAC sublayer of the first node, and the first indication indicates the first time-domain resource.

In one embodiment, the first indication is used to determine the first time length.

In one embodiment, the first transmitter determines the first time length based on the first indication.

In one embodiment, the first transmitter determines the first time length based on the first indication and a time for receiving the first data unit.

In one embodiment, the first indication is an interlayer indication between protocol layers.

In one embodiment, the first transmitter determines the first time length at the MAC sublayer based on the first indication.

In one embodiment, the first indication indicating the first time-domain resource comprises: the first indication comprises a time interval between a start time of the first time-domain resource and a transmission time of the first indication.

In one embodiment, the first indication indicating the first time-domain resource comprises: the first indication comprises a time interval between an end time of the first time-domain resource and a transmission time of the first indication.

In one subembodiment of the above two embodiments, the first time length is a sum of a time interval between receiving the first data unit at the MAC sublayer and receiving the first indication plus the time interval indicated by the first indication.

In one embodiment, the first indication indicating the first time-domain resource comprises: the first indication comprises a time interval between a start time of the first time-domain resource and an end time for receiving the first signaling.

In one embodiment, the first indication indicating the first time-domain resource comprises: the first indication comprises a time interval between an end time of the first time-domain resource and an end time for receiving the first signaling.

In one subembodiment of the above two embodiments, the first time length is a sum of a time interval between receiving the first data unit at the MAC sublayer and receiving the first signaling plus the time interval indicated by the first indication.

In one embodiment, the first indication indicating the first time-domain resource comprises: the first indication comprises a start time of the first time-domain resource.

In one embodiment, the first indication indicating the first time-domain resource comprises: the first indication comprises an end time of the first time-domain resource.

In one subembodiment of the above two embodiments, the first time length is a time length between a time for receiving the first data unit at the MAC sublayer and a time indicated by the first indication.

In one embodiment, the first indication comprises slot number.

In one embodiment, the first indication comprises slot number and symbol offset.

In one embodiment, the first indication is transmitted from the physical layer of the first node to the MAC sublayer of the first node.

In one embodiment, the first transmitter, when the first time length is greater than the first time threshold, a MAC sublayer of the first node transmits the first control information to a physical layer of the first node.

In one embodiment, the first transmitter, when the first time length is less than the first time threshold, a MAC sublayer of the first node does not transmit the first control information to a physical layer of the first node.

In one embodiment, the first transmitter, when the first time length is equal to the first time threshold, a MAC sublayer of the first node transmits the first control information to a physical layer of the first node.

In one embodiment, the first transmitter, when the first time length is equal to the first time threshold, a MAC sublayer of the first node does not transmit the first control information to a physical layer of the first node.

Embodiment 7

Figure 7:
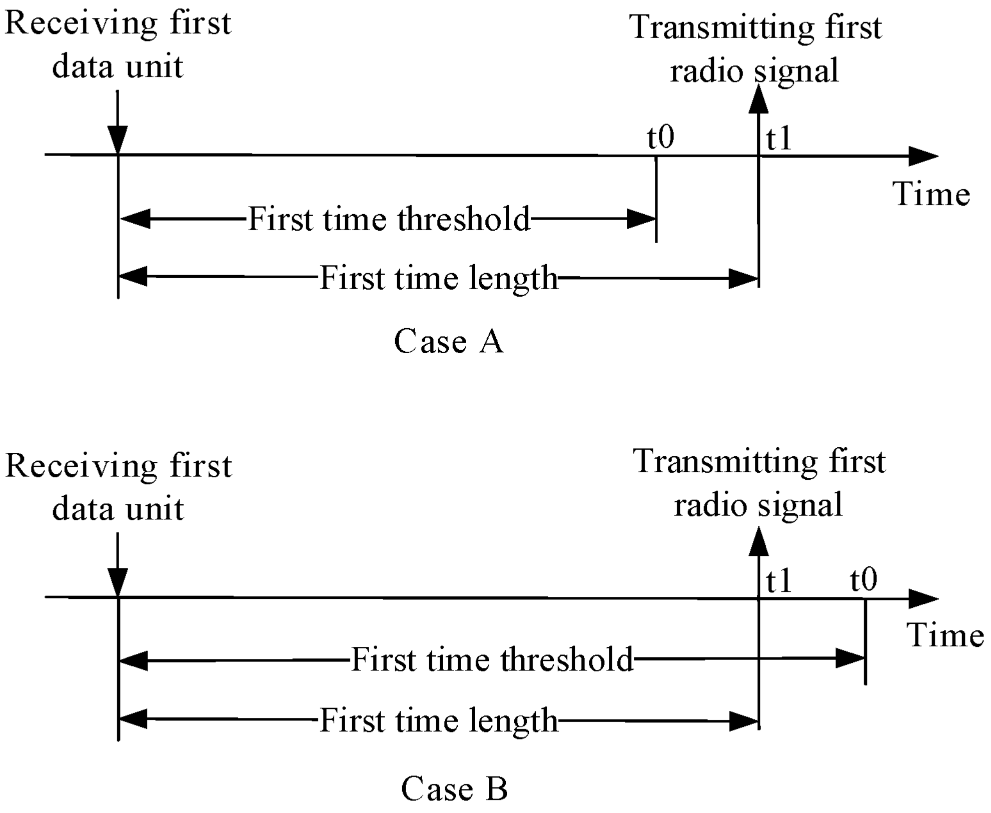
FIG. 7 illustrates a schematic diagram of relations among a first data unit, a first time threshold, a first time length and a first radio signal according to one embodiment of the present application.

Embodiment 7 illustrates a schematic diagram of relations among a first data unit, a first time threshold, a first time length and a first radio signal according to one embodiment of the present application, as shown in FIG. 7. In FIG. 7, t0 is a latest transmission time allowed by a first data unit; t1 is a transmission time of a first radio signal.

In one embodiment, a first transmitter, when the first time length is greater than the first time threshold, transmits the first control information.

In one embodiment, a first transmitter, when the first time length is equal to the first time threshold, transmits the first control information.

In one subembodiment of the above two embodiments, the first control information is transmitted through a first radio signal.

In one embodiment, the first radio signal is a PUCCH.

In one embodiment of the above embodiment, time-domain resources of the PUCCH and the first time-domain resource at least have partial overlapping.

In one embodiment of the above embodiment, a transmission priority of the PUCCH is higher than a transmission priority of the first MAC PDU.

In one embodiment, the first radio signal is a Physical Uplink Shared Channel (PUSCH).

In one subembodiment of the above embodiment, the first time-domain resource is used for a transmission of the PUSCH.

In one embodiment, by transmitting the first control information, the base station can be indicated to stop a retransmission scheduling for the first MAC PDU, thereby avoiding wasting radio resources.

In one embodiment, the first transmitter, when the first time length is less than the first time threshold, drops transmitting the first control information.

In one embodiment, the first transmitter, when the first time length is equal to the first time threshold, drops transmitting the first control information.

In one embodiment, a first bit set comprises the first control information.

In one embodiment, all or partial bits of the first bit set are used to generate the first radio signal.

In one embodiment, all or partial bits of the first bit set are used together with a reference signal to generate the first radio signal.

In one embodiment, all or partial bits in a first bit set acquire the first radio signal sequentially through CRC Calculation, Channel Coding, Rate matching, Scrambling, Modulation, Layer Mapping, Antenna Port Mapping, Mapping to Virtual Resource Blocks, Mapping from Virtual to Physical Resource Blocks, OFDM Baseband Signal Generation and Modulation and Up conversion.

In case A of FIG. 7, t0 is earlier than t1, that is, the first time length is greater than the first time threshold, and a first radio signal carries the first control information.

In case B of FIG. 7, t0 is later than t1, that is, the first time length is less than the first time threshold, and a first radio signal does not carry the first control information.

Embodiment 8

Figure 8:
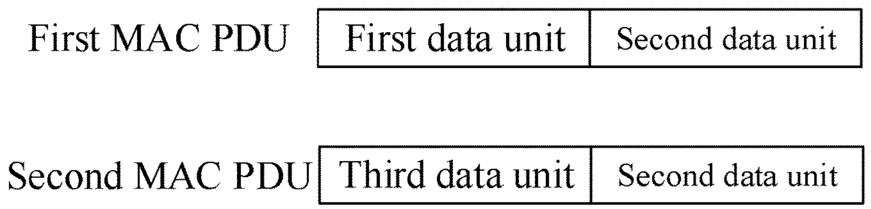
FIG. 8 illustrates a schematic diagram of a first MAC PDU and a second MAC PDU according to one embodiment of the present application.

Embodiment 8 illustrates a schematic diagram of a first MAC PDU and a second MAC PDU according to one embodiment of the present application, as shown in FIG. 8.

In one embodiment, when the first time length is greater than the first time threshold, a second MAC PDU is transmitted on the first time-domain resource, the second MAC PDU does not comprise the first data unit; herein, the first control information indicates a new transmission, and a transmission of the first control information occupies the first time-domain resource.

In one embodiment, when the first time length is greater than the first time threshold, the first control information and a second MAC PDU are transmitted on the first time-domain resource, the second MAC PDU does not comprise the first data unit; herein, the first control information indicates a new transmission.

In one embodiment, when the first time length is greater than the first time threshold, a PUSCH is transmitted on the first time-domain resource, the PUSCH carries the first control information and a second MAC PDU, and the second MAC PDU does not comprise the first data unit; herein, the first control information indicates a new transmission.

In one embodiment, by transmitting the first control information through a first time-domain resource, the receiver can know that a radio signal carried on the first time-domain resource is a new transmission, thus avoiding errors incurred by incorrect merge decoding.

In one embodiment, by transmitting the second MAC PDU through a first time-domain resource, the utilization rate of radio resources can be improved.

In one embodiment, when the first time length is less than the first time threshold, the first time-domain resource is used for a retransmission of the first MAC PDU.

In one embodiment, when the first time length is equal to the first time threshold, the first time-domain resource is used for a retransmission of the first MAC PDU.

In one subembodiment of the above two embodiments, the first control information is not transmitted.

In one embodiment, the second MAC PDU does not comprise the first data unit.

In one embodiment, the second MAC PDU does not comprise any MAC SDU in the first MAC PDU.

In one embodiment, the second MAC PDU does not comprise any bit in the first MAC PDU.

In one embodiment, the second MAC PDU comprises a data bit other than the first data unit in the first MAC PDU.

In one embodiment, when the first time length is greater than the first time threshold, the first control information and the first MAC PDU are transmitted on the first time-domain resource; the first control information indicates dropping retransmission of the first MAC PDU.

In one embodiment, the first control information implicitly indicates dropping retransmission of the first MAC PDU.

In one embodiment, the first control information comprises 1 bit, and when a value of the first control information is 1, it indicates a new transmission; when a value of the first control information is 0, it indicates dropping retransmission of the first MAC PDU.

In one embodiment, the first control information comprises 1 bit, and when a value of the first control information is 0, it indicates a new transmission; when a value of the first control information is 1, it indicates dropping retransmission of the first MAC PDU.

In one embodiment, the first MAC PDU and the second MAC PDU respectively comprise a second data unit.

In one embodiment, the first transmitter generates the second MAC PDU at the MAC sublayer; herein, the first time length is greater than the first time threshold.

In one embodiment, generating the second MAC PDU comprises: removing the first data unit multiplexed in the first MAC PDU and multiplexing the second data unit from the second data unit in the first MAC PDU into the second MAC PDU.

In one embodiment, the above method can avoid transmitting useless data units via an air interface, thus improving the utilization of spectrum resources.

In one embodiment, the above method can continue to transmit unexpired data units to avoid unnecessary packet loss.

In one embodiment, the second data unit and the first data unit belong to a same logical channel.

In one embodiment, the second data unit and the first data unit belong to different logical channels.

In one embodiment, when the second data unit and the first data unit belong to a same logical channel, a second time length is less than the first time threshold.

In one embodiment, the second time length is a time interval between a reception of the second data unit and the first time-domain resource.

In one embodiment, when the second data unit and the first data unit do not belong to a same logical channel, a second time length is less than a second time threshold.

In one embodiment, the second time threshold is used to indicate a longest time interval between the second data unit being received and the second data unit being transmitted.

In one embodiment, generating the second MAC PDU comprises: multiplexing a third data unit into the second MAC PDU; herein, a number of bit(s) comprised in the third data unit is not greater than a number of bit(s) comprised in the removed first data unit.

In one embodiment, the third data unit and the first data unit belong to a same logical channel.

In one embodiment, the third data unit and the first data unit belong to different logical channels.

In one embodiment, the above method can transmit more useful data units.

In one embodiment, the above method can reduce the transmission delay.

In one embodiment, a radio signal transmitted through the first time-domain resource does not comprise a MAC PDU.

In one embodiment, a radio signal transmitted through the first time-domain resource only comprises a UCI, and the UCI comprises the first control information.

In one subembodiment of the above two embodiments, the first time length is greater than the first time threshold and a time interval from each MAC SDU in the first MAC PDU being received to the first time-domain resource respectively exceeds a remaining packet delay budget and does not have packets pending to be transmitted.

In one subembodiment of the above two embodiments, a radio signal transmitted through the first time-domain resource is a PUSCH.

In one embodiment, the first transmitter, when the first time length is greater than the first time threshold, drops a retransmission for the first MAC PDU.

In one embodiment, the first transmitter, when the first time length is greater than the first time threshold, drops a retransmission for the first data unit.

In one embodiment, the dropping retransmission of the first MAC PDU comprises: executing a new transmission for a second MAC PDU.

In one embodiment, the dropping a retransmission for the first data unit comprises: dropping the first data unit.

In one embodiment, the dropping a retransmission for the first data unit comprises: dropping an RLC SDU to which the first data unit belongs.

In one embodiment, the dropping a retransmission for the first data unit comprises: executing a transmission for a second data unit.

In FIG. 8, the first MAC PDU comprises the first data unit and the second data unit; the second MAC PDU comprises the third data unit and the second data unit; the second MAC PDU is transmitted on the first time-domain resource.

Embodiment 9

Figure 9:
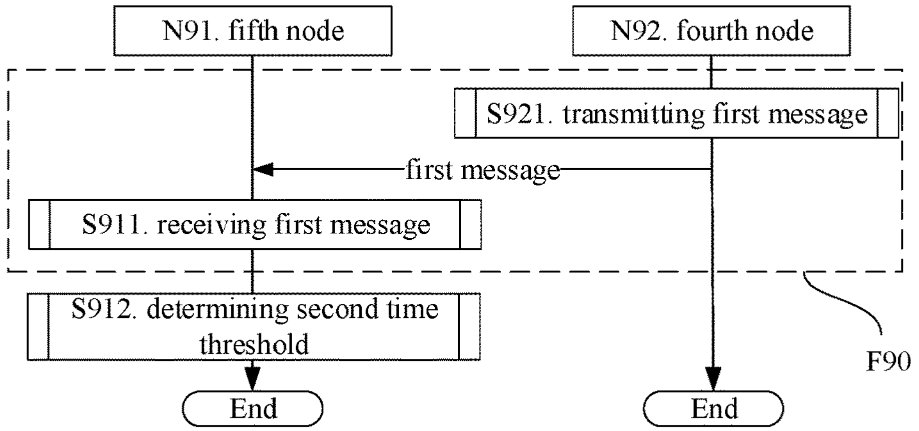
FIG. 9 illustrates a flowchart of signal transmission according to one embodiment of the present application.

Embodiment 9 illustrates a flowchart of signal transmission according to one embodiment in the present application, as shown in FIG. 9, where steps in dotted box F90 are optional.

The fifth node N91 receives a first message in step S911; determines a second time threshold in step S912.

The fourth node N92 transmits a first message in step S921.

In one embodiment, the fifth node N91 is a first node in the present application, or the second node in the present application.

In one embodiment, when a fifth node N91 is a first node or UE in the present application, the fifth node N91 and the fourth node N92 are in communications through an N1 reference point.

In one embodiment, when the fifth node N91 is a second node or a maintenance base station of the UE's serving cell in the present application, the fifth node N91 and the fourth node N92 are in communications through an N2 reference point.

In one embodiment, the fourth node is a core network node.

In one embodiment, the fourth node is an AMF.

In one embodiment, the fourth node is an SMF.

In one embodiment, the fourth node is not co-located with the second node in the present application.

In one embodiment, the fourth node N92 corresponds to MME/AMF/SMF211 in FIG. 2 of the present application.

In one embodiment, a first message is received, the first message is used to configure a QoS flow to which the first data unit belongs.

In one embodiment, the first message is a higher-layer message.

In one embodiment, the first message is a Non Access Stratum (NAS) message.

In one embodiment, the first message comprises a QoS configuration profile.

In one embodiment, the first message comprises a QoS rule.

In one embodiment, the first message comprises QoS parameters of a QoS flow to which the first data unit belongs.

In one embodiment, the QoS parameters comprise a PDB.

In one embodiment, the first message is received from the NAS layer.

In one embodiment, the first message is transmitted within the node.

In one subembodiment of the above embodiment, the second node is pre-configured with a QoS configuration profile.

In one subembodiment of the above embodiment, the first node is pre-configured with a QoS rule.

In one embodiment, the QoS configuration profile or the QoS rule comprises QoS parameters.

In one embodiment, the first node generates a QoS rule based on received downlink services; herein, the first node is configured with Reflective QoS.

In one embodiment, the second time threshold is the same as a PDB value of a QoS flow to which the first data unit belongs.

In one embodiment, the second time threshold is greater than a PDB value of a QoS flow to which the first data unit belongs.

In one embodiment, the second time threshold is a difference value of a PDB value of a QoS flow to which the first data unit belongs minus a reference value.

In one embodiment, the reference value is pre-configured.

In one embodiment, the reference value is fixed.

In one embodiment, the reference value is determined by the fifth node itself.

In one embodiment, the base station receives QoS parameters of a QoS flow to which the first data unit belongs transmitted by the core network, the QoS parameters comprise a PDB, and the base station determines the second time threshold based on the PDB and transmits it to the UE.

In one embodiment, the UE receives QoS parameters of a QoS flow to which the first data unit belongs transmitted by the core network, the QoS parameters comprise a PDB, and the UE determines the second time threshold based on the PDB.

In one embodiment, the second time threshold is used to characterize a radio bearer to which the first data unit belongs.

In one embodiment, the second time threshold is used to characterize a logical channel to which the first data unit belongs.

Embodiment 10

Figure 10:
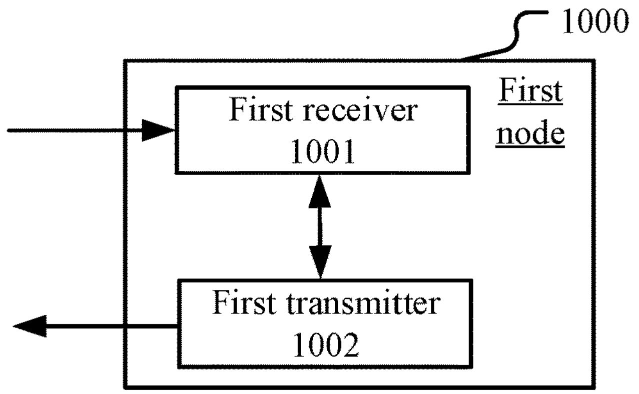
FIG. 10 illustrates a structure block diagram of a processor in a first node according to one embodiment of the present application.

Embodiment 10 illustrates a structure block diagram of a processor in a first node according to one embodiment of the present application, as shown in FIG. 10.

In FIG. 10, a processor 1000 in a first node comprises a first receiver 1001 and a first transmitter 1002. The first node 1000 is a UE.

In embodiment 10, the first receiver 1001 receives a first data unit at a MAC sublayer; receives a first signaling, the first signaling indicates a first time-domain resource, the first time-domain resource is reserved for retransmission of a first MAC PDU, the first MAC PDU comprises the first data unit; herein, a first time length is a length of a time interval between a reception of the first data unit and the first time-domain resource, whether to transmit first control information depends on a size relation between the first time length and a first time threshold; the first control information is used to indicate dropping retransmission of the first MAC PDU; the first time threshold is used to indicate a longest time interval between the first data unit being received and the first data unit being transmitted.

In one embodiment, the first control information is uplink control information.

In one embodiment, the first transmitter 1002, when the first time length is greater than the first time threshold, transmits the first control information.

In one embodiment, the first transmitter 1002, when the first time length is greater than the first time threshold, transmits the first control information; the first transmitter 1002 transmits a second MAC PDU on the first time-domain resource, the second MAC PDU does not comprise the first data unit; herein, the first control information indicates a new transmission, and a transmission of the first control information occupies the first time-domain resource.

In one embodiment, the first transmitter 1002, when the first time length is greater than the first time threshold, transmits the first control information; the first transmitter 1002 transmits a second MAC PDU on the first time-domain resource, the second MAC PDU does not comprise the first data unit; herein, the first control information indicates a new transmission, and a transmission of the first control information occupies the first time-domain resource; the first MAC PDU and the second MAC PDU respectively comprise a second data unit.

In one embodiment, the first transmitter 1002 transmits a first indication from a physical layer of the first node to a MAC sublayer of the first node, the first indication indicates the first time-domain resource; herein, the first indication is used to determine the first time length.

In one embodiment, the first receiver 1001 receives a second signaling, and the second signaling indicates a second time threshold; herein, the second time threshold indicates a longest residing time of a first PDCP SDU at a PDCP sublayer, and the first PDCP SDU is used to generate the first data unit; the second time threshold and a protocol processing time are used to determine the first time threshold.

In one embodiment, the first transmitter is used for inter-layer communications.

In one embodiment, the first transmitter comprises inter-layer transmission primitives.

In one embodiment, the first transmitter comprises a set of indications used for completing transmission functions.

In one embodiment, the first receiver 1001 comprises the receiver 454 (comprising the antenna 452), the receiving processor 456, the multi-antenna receiving processor 458 and the controller/processor 459 in FIG. 4 of the present application.

In one embodiment, the first receiver 1001 comprises at least one of the receiver 454 (comprising the antenna 452), the receiving processor 456, the multi-antenna receiving processor 458 or the controller/processor 459 in FIG. 4 of the present application.

In one embodiment, the first receiver 1001 comprises the controller/processor 459 in FIG. 4 of the present application.

In one embodiment, the first transmitter 1102 comprises the receiver 454 (comprising the antenna 452), the transmitting processor 468, the multi-antenna transmitting processor 457 and the controller/processor 459 in FIG. 4 of the present application.

In one embodiment, the first transmitter 1102 comprises at least one of the receiver 454 (comprising the antenna 452), the transmitting processor 468, the multi-antenna transmitting processor 457 or the controller/processor 459 in FIG. 4 of the present application.

In one embodiment, the first transmitter 1002 comprises the controller/processor 459 in FIG. 4 of the present application.

Embodiment 11

Figure 11:
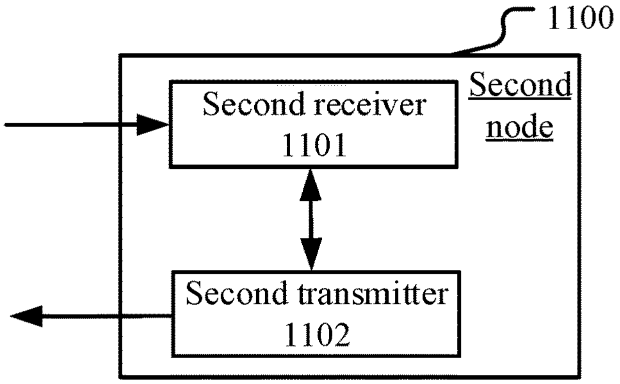
FIG. 11 illustrates a structure block diagram of a processor in second node according to one embodiment of the present application.

Embodiment 11 illustrates a structure block diagram of a processor in a second node according to one embodiment of the present application, as shown in FIG. 11. In FIG. 11, a processor 1100 in a second node comprises a second receiver 1101 and a second transmitter 1102; the second node 1100 is a base station.

In embodiment 11, the second transmitter 1102 transmits a first signaling, the first signaling indicates a first time-domain resource, the first time-domain resource is reserved for retransmission of a first MAC PDU, and the first MAC PDU comprises the first data unit; herein, a first data unit is received at a MAC sublayer by a receiver of the first signaling; a first time length is a length of a time interval between a reception of the first data unit and the first time-domain resource, whether to receive the first control information depends on a size relation between the first time length and the first time threshold; the first control information is used to indicate dropping retransmission of the first MAC PDU; the first time threshold is used to indicate a longest time interval between the first data unit being received and the first data unit being transmitted.

In one embodiment, the first control information is uplink control information.

In one embodiment, the second receiver 1101, when the first time length is greater than the first time threshold, receives the first control information.

In one embodiment, the second receiver 1101, when the first time length is greater than the first time threshold, receives the first control information; the second receiver 1101 receives a second MAC PDU on the first time-domain resource, the second MAC PDU does not comprise the first data unit; herein, the first control information indicates a new transmission, and a transmission of the first control information occupies the first time-domain resource.

In one embodiment, the second receiver 1101, when the first time length is greater than the first time threshold, receives the first control information; the second receiver 1101 receives a second MAC PDU on the first time-domain resource, the second MAC PDU does not comprise the first data unit; herein, the first control information indicates a new transmission, and a transmission of the first control information occupies the first time-domain resource; the first MAC PDU and the second MAC PDU respectively comprise a second data unit.

In one embodiment, a first indication is transmitted from a physical layer of a receiver of the first signaling to a MAC sublayer of the receiver of the first signaling, and the first indication indicates the first time-domain resource; herein, the first indication is used to determine the first time length.

In one embodiment, the second transmitter 1102 transmits a second signaling, and the second signaling indicates a second time threshold; herein, the second time threshold indicates a longest residing time of a first PDCP SDU at a PDCP sublayer, and the first PDCP SDU is used to generate the first data unit; the second time threshold and a protocol processing time are used to determine the first time threshold.

In one embodiment, the second receiver 1101 comprises the transmitter 418 (comprising the antenna 420), the receiving processor 470, the multi-antenna receiving processor 472 and the controller/processor 475 in FIG. 4 in the present application.

In one embodiment, the second receiver 1101 comprises at least one of the transmitter 418 (comprising the antenna 420), the receiving processor 470, the multi-antenna receiving processor 472 or the controller/processor 475 in FIG. 4 in the present application.

In one embodiment, the second transmitter 1102 comprises the transmitter 418 (including the antenna 420), the transmitting processor 416, the multi-antenna transmitting processor 471 and controller/processor 475 in FIG. 4 of the present application.

In one embodiment, the second transmitter 1102 comprises at least one of the transmitter 418 (including the antenna 420), the transmitting processor 416, the multi-antenna transmitting processor 471 or the controller/processor 475 in FIG. 4 of the present application.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. A first-type communication node or a UE or a terminal in the present application includes but not limited to mobile phones, tablet computers, laptops, network cards, low-power devices, enhanced Machine Type Communication (eMTC) devices, NB-IOT devices, vehicle-mounted communication equipment, aircrafts, airplanes, unmanned aerial vehicles (UAV), tele-controlled aircrafts and other wireless communication devices. The second-type communication node or the base station or the network side device in the present application includes but is not limited to the macro-cellular base stations, micro-cellular base stations, home base stations, relay base stations, eNB, gNB, Transmission and Reception Points (TRP), relay satellites, satellite base stations, air base stations, testing devices, such as transceiver devices that simulate some functions of base stations, signaling testers and other wireless communication devices.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communications, the UE comprising:
- a transceiver; and
- a processor, wherein the transceiver and the processor are configured to:
  - receive a first data unit at a Medium Access Control (MAC) sublayer,
  - receive a first signaling indicative of a first time-domain resource reserved for retransmission of a first MAC Protocol Data Unit (PDU), wherein the first MAC PDU comprises the first data unit,
  - determine a first time length to be a length of a time interval between a reception of the first data unit and the first time-domain resource,
  - on a condition that the first time length is greater than a first time threshold, transmit the first control information indicative of dropping retransmission of the first MAC PDU, wherein the first time threshold is used to indicate a longest time interval between the first data unit being received and the first data unit being transmitted,
  - on a condition that the first time length is less than the first time threshold, drop transmission of the first control information.

2. The UE according to claim 1, wherein the first control information is uplink control information.

3. The first node UE according to claim 1, comprising wherein the transceiver and the processor are further configured to: the first transmitter, transmit a second MAC PDU on the first time-domain resource, wherein the second MAC PDU does not comprising comprise the first data unit, and wherein the first control information indicates a new transmission, and wherein a transmission of the first control information occupies the first time-domain resource.

4. The UE according to claim 3, wherein the first MAC PDU and the second MAC PDU respectively comprise a second data unit, and wherein the second data unit and the first data unit belong to a same logical channel.

5. The UE according to claim 1, wherein the transceiver and the processor are further configured to:
- transmit a first indication from a physical layer of the first node to a MAC sublayer of the first node, wherein the first indication indicates the first time-domain resource, and wherein the first indication is used to determine the first time length.

6. The UE according to claim 1, wherein the transceiver and the processor are further configured to:
- receive a second signaling indicating a second time threshold, wherein the second time threshold indicates a longest residing time of a first Packet Data Convergence Protocol (PDCP) Service Data Unit (SDU) at a PDCP sublayer, and wherein the first PDCP SDU is used to generate the first data unit, and wherein the second time threshold and a protocol processing time are used to determine the first time threshold.

7. A base station for wireless communications, the base station comprising:
- a transceiver; and
- a processor, wherein the transceiver and the processor are configured to:
  - transmit a first signaling indicative of a first time-domain resource reserved for retransmission of a first Medium Access Control (MAC) Protocol Data Unit (PDU) comprising a first data unit, wherein the first data unit is received at a MAC sublayer by a receiver of the first signaling; and wherein a first time length is a length of a time interval between a reception of the first data unit and the first time-domain resource, and
  - on a condition that the first time length is greater than a first time threshold, receive the first control information indicative of dropping retransmission of the first MAC PDU, wherein the first time threshold is used to indicate a longest time interval between the first data unit being received and the first data unit being transmitted, and
  - on a condition that the first time length is less than the first time threshold, the first control information is not received.

8. The base station according to claim 7, wherein the first control information is uplink control information.

9. The base station according claim 7 wherein the transceiver and the processor are further configured to: the second receiver, receiving receive a second MAC PDU on the first time-domain resource, wherein the second MAC PDU does not comprise the first data unit, and wherein the first control information indicates a new transmission, and wherein a transmission of the first control information occupies the first time-domain resource.

10. The base station according to claim 7, wherein a first indication is transmitted from a physical layer of the receiver of the first signaling to a MAC sublayer of the receiver of the first signaling, and wherein the first indication indicates the first time-domain resource, and wherein the first indication is used to determine the first time length.

11. The base station according to claim 7, wherein the transceiver and the processor are further configured to:

transmit a second signaling indicating a second time threshold, wherein the second time threshold indicates a longest residing time of a first Packet Data Convergence Protocol (PDCP) Service Data Unit (SDU) at a PDCP sublayer, and wherein the first PDCP SDU is used to generate the first data unit, and wherein the second time threshold and a protocol processing time are used to determine the first time threshold.

12. A method in a user equipment (UE) for wireless communications, the method comprising:

receiving a first data unit at a Medium Access Control (MAC) sublayer;

receiving a first signaling indicative of a first time-domain resource reserved for retransmission of a first MAC Protocol Data Unit (PDU), the first MAC PDU comprising the first data unit;

determining a first time length to be a length of a time interval between a reception of the first data unit and the first time-domain resource;

on a condition that the first time length is greater than a first time threshold, transmit the first control information indicative of dropping retransmission of the first MAC PDU, wherein the first time threshold is used to indicate a longest time interval between the first data unit being received and the first data unit being transmitted;

on a condition that the first time length is less than a first time threshold; dropping transmission of the first control.

13. The method in a UE according to claim 12, wherein the first control information is uplink control information.

14. The method in a UE according to claim 12 further comprising:

transmitting a second MAC PDU on the first time-domain resource, wherein the second MAC PDU does not comprising comprise the first data unit, and wherein the first control information indicates a new transmission, and wherein a transmission of the first control information occupies the first time-domain resource.

15. The method in a UE according to claim 14, wherein the first MAC PDU and the second MAC PDU respectively comprise a second data unit, and wherein the second data unit and the first data unit belong to a same logical channel.

16. The method in a UE according to claim 12, further comprising:

transmitting a first indication from a physical layer of the first node to a MAC sublayer of the first node, wherein the first indication indicates the first time-domain resource, and wherein the first indication is used to determine the first time length.

17. The method in a UE according to claim 12, further comprising:

receiving a second signaling indicating a second time threshold, wherein the second time threshold indicates a longest residing time of a first Packet Data Convergence Protocol (PDCP) Service Data Unit (SDU) at a PDCP sublayer, and wherein the first PDCP SDU is used to generate the first data unit, and wherein the second time threshold and a protocol processing time are used to determine the first time threshold.

* * * * *